United States Patent
DeLuca et al.

(10) Patent No.: US 10,747,795 B2
(45) Date of Patent: Aug. 18, 2020

(54) COGNITIVE RETRIEVE AND RANK SEARCH IMPROVEMENTS USING NATURAL LANGUAGE FOR PRODUCT ATTRIBUTES

(71) Applicant: International Business Machines Corporation, Armonk, NY (US)

(72) Inventors: Lisa Seacat DeLuca, Baltimore, MD (US); Raghuram Srinivas, Collin, TX (US); Faheem Altaf, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/868,558

(22) Filed: Jan. 11, 2018

(65) Prior Publication Data
US 2019/0213277 A1    Jul. 11, 2019

(51) Int. Cl.
*G06F 17/00* (2019.01)
*G06F 16/33* (2019.01)
(Continued)

(52) U.S. Cl.
CPC .... *G06F 16/3344* (2019.01); *G06F 16/24578* (2019.01); *G06Q 30/0627* (2013.01); *G06Q 30/0641* (2013.01)

(58) Field of Classification Search
CPC .......... G06F 16/3344; G06F 16/24578; G06Q 30/0627; G06Q 30/0641
See application file for complete search history.

(56) References Cited

U.S. PATENT DOCUMENTS 6,728,706 B2    4/2004   Aggarwal et al.
7,082,426 B2    7/2006   Musgrove et al.
(Continued)

FOREIGN PATENT DOCUMENTS

WO    WO 2013009613 A1    1/2013

OTHER PUBLICATIONS

Jeffrey Pound et al., Facet Discovery for Structured Web Search: A Query-Log Mining Approach, SIGMOD '11: Proceedings of the 2011 ACM SIGMOD International Conference on Management of Data, pp. 169-180, Jun. 2011.*
(Continued)

*Primary Examiner* — Greta L Robinson
(74) *Attorney, Agent, or Firm* — Schmeiser, Olsen & Watts; Stephanie Carusillo

(57) ABSTRACT

A method, computer system, and computer readable program product for generating text for a search corpus. In an embodiment, the method comprises analyzing structured data associated with an entity; and breaking the structured data into multiple unstructured natural language pair attributes such that natural language search terms have an increased level of matching with attributes associated with the entity, including filtering the structured data to identify a filtered group of attributes, and using the filtered group of attributes to form the natural language pair attributes. The method further comprises saving the formed natural language pairs in a search corpus. In an embodiment, the method further comprises generating a cluster of the attributes based on semantic similarities; and the using the filtered gropo of attributes to form the natural language pair attributes includes creating separate blocks of text that respectively describe the attributes included in the cluster of attributes.

19 Claims, 5 Drawing Sheets

| Product information Technical Details | |
|---|---|
| Part Number | 215454 |
| Item Weight | 5.3 pounds |
| Product Dimensions | 15.1 x 4.2 x 5.8 inches |
| Item model number | WX429L |
| Size | 4-1/2" |
| Color | Black |
| Power Source | corded-electric |
| Item Package Quantity | 1 |
| Included Components | Bare-Tool |
| Batteries Included? | No |
| Batteries Required? | No |

(51) Int. Cl.
*G06Q 30/06* (2012.01)
*G06F 16/2457* (2019.01)

(56) References Cited

U.S. PATENT DOCUMENTS

| | | |
|---|---|---|
| 7,219,099 B2 | 5/2007 | Kuntala et al. |
| 7,908,166 B2 | 3/2011 | Keil et al. |
| 8,156,073 B1 | 4/2012 | Dave |
| 8,589,399 B1 | 11/2013 | Lee |
| 9,311,372 B2 | 4/2016 | Garera et al. |
| 9,569,700 B1 | 2/2017 | Santos |
| 10,235,449 B1 * | 3/2019 | Viswanathan ........ G06F 17/218 |
| 2001/0044795 A1 | 11/2001 | Cohen |
| 2003/0037034 A1 | 2/2003 | Daniels |
| 2003/0195793 A1 | 10/2003 | Jain et al. |
| 2004/0015415 A1 | 1/2004 | Cofino et al. |
| 2004/0205044 A1 | 10/2004 | Su et al. |
| 2005/0055357 A1 | 3/2005 | Campbell |
| 2008/0097822 A1 | 4/2008 | Schigel |
| 2009/0150141 A1 | 6/2009 | Wible |
| 2010/0121631 A1 | 5/2010 | Bonnet |
| 2012/0143883 A1 | 6/2012 | Chen |
| 2013/0013616 A1 | 1/2013 | Leidner et al. |
| 2013/0024440 A1 * | 1/2013 | Dimassimo ........... G06F 16/338 707/709 |
| 2015/0378975 A1 | 12/2015 | Wu et al. |
| 2016/0203217 A1 | 7/2016 | Anisingaraju |
| 2016/0283998 A1 * | 9/2016 | Pathak ................. G06F 16/245 |
| 2016/0292705 A1 | 10/2016 | Ayzenshtat |
| 2016/0379289 A1 | 12/2016 | More |
| 2017/0124619 A1 | 5/2017 | Abhishek |
| 2017/0177710 A1 | 6/2017 | Burlik |
| 2017/0178037 A1 | 6/2017 | Kaye |
| 2017/0221120 A1 | 8/2017 | Pathak |
| 2018/0210957 A1 | 7/2018 | Altaf |

OTHER PUBLICATIONS

Xiang Ren et al., Building Structured Databases of Factual Knowledge From Massive-Text Corpora, SIGMOD '17: Proceedings of the 2017 ACM International Conference on Management of Data, pp. 1741-1745, May 2017.*

Friedman, Mark J.; List of IBM Patents or Patent Applications Treated as Related; May 28, 2019; 1 page.

* cited by examiner

Power Source
   Electric
   Pneumatic
   Gas

Power Tool Card Style
   Corded
   Cordless

Tool Items included
   Bare Tool
   Case
   Stand
   Attachments
   Battery

Brand
   BLACK+DECKER
   Skil
   Rockwell
   Stanley
   Hitachi
   DEWALT
   Saws
   Worx
   Milwaukee
   Makita
   Bosch
   Powermatic
   Kreg
See more

Saw Blade Size
6.25 Inch    8.5 Inch
6.5 Inch     10 Inch
7.25 Inch    12 Inch
8 Inch       14 Inch
8.25 Inch

FIG. 3

| Product information Technical Details | |
|---|---|
| Part Number | 215454 |
| Item Weight | 5.3 pounds |
| Product Dimensions | 15.1 x 4.2 x 5.8 inches |
| Item model number | WX429L |
| Size | 4-1/2" |
| Color | Black |
| Power Source | corded-electric |
| Item Package Quantity | 1 |
| Included Components | Bare-Tool |
| Batteries Included? | No |
| Batteries Required? | No |

FIG. 4

COGNITIVE RETRIEVE AND RANK SEARCH IMPROVEMENTS USING NATURAL LANGUAGE FOR PRODUCT ATTRIBUTES

BACKGROUND

This invention generally relates to converting structured data into unstructured text to enable natural language searching.

Often, when people have a topic to research, they search through the Internet; and in order to research a given topic, people will often perform a natural language or keyword search. A natural language search is a search wherein the searcher uses a regular, spoken language, such as English, to enter a search query. For example, when searching through the catalog of a home improvement retailer, a searcher may identify a particular product and enter "what are the dimensions" in a search box.

Natural language searching does not necessarily use the language as it is usually spoken (i.e., in sentences), and one or more words or terms in a search query may be used in a way that does not form a standard sentence. For instance, a person searching through a home improvement catalog who wants to know what colors of refrigerators are available, may enter "Refrigerator Colors."

Search using natural language is an extremely user friendly method of searching. Most enterprises' systems of records, however, have data in a structured format, and this data is not readily available for natural language search.

Differentiating between unstructured data and structured data is based upon whether the data is associated with a logical schema. Structured data is data that is associated with a logical schema, while unstructured data is data unassociated with a logical schema. Thus, unlike unstructured data, structured data is associated with a specification as to how the data may be found or located in an unambiguous manner. For example, a specification for a relational database table of ordered names, street addresses, towns, states, and zip codes might state that zip codes are found in column five (whereas names, street addresses, towns, and states are found in columns one, two three, and four, respectively).

Examples of structured data include, but are not limited to, relational databases (which use the Data Definition Language [DDL] for writing logical schema), XML databases (which use an XML schema to describe the structure of XML files and the types of the data contained therein) and spreadsheets (which provide a manner in which to accurately identify data stored within fixed fields within a record or file). Examples of unstructured data include, but are not limited to, email messages, word processing documents, documents in .pdf format, web pages, and other types of data comprising free-form text. Thus, as mentioned above, the difference between structured data and unstructured data is that structured data is associated with a specification as to how data may be found or located in an unambiguous manner.

Unfortunately, natural language search engines are ineffective at providing search results from structured data. This problem is made more acute by the fact that people are becoming more and more accustomed to searching for information using natural language searches.

SUMMARY

Embodiments of the invention provide a method, computer system, and computer readable program product for generating text for a search corpus. In an embodiment, the method comprises analyzing structured data associated with an entity; and breaking the structured data into multiple unstructured natural language pair attributes such that natural language search terms have an increased level of matching with attributes associated with the entity. In embodiments, this breaking the structured data into multiple unstructured natural language pair attributes includes filtering the structured data, based on predetermined criteria, to identify a filtered group of attributes associated with the entity, and using the filtered group of attributes to form the natural language pair attributes. The method further comprises saving the formed natural language pairs in a search corpus In an embodiment, the method further comprises generating a cluster of the attributes from the filtered group of attributes based on semantic similarities. In an embodiment, the using the filtered group of attributes to form the natural language pair attributes includes creating separate blocks of text that respectively describe the attributes included in the cluster of the attributes.

Embodiments of the invention comprise examining structured data associated with an entity in a data catalog, breaking the structured data into multiple unstructured natural language pair attributes such that natural language search terms can better match the attributes associated with the entity, and returning a tailored search result based on the matching.

BRIEF DESCRIPTION OF THE SEVERAL VIEWS OF THE DRAWINGS

FIG. 3 lists search facets that may be used to filter attributes associated with an entity.

FIG. 4 shows a list of technical details of a product that may be used to generate unstructured text.

DETAILED DESCRIPTION

Figure 1:
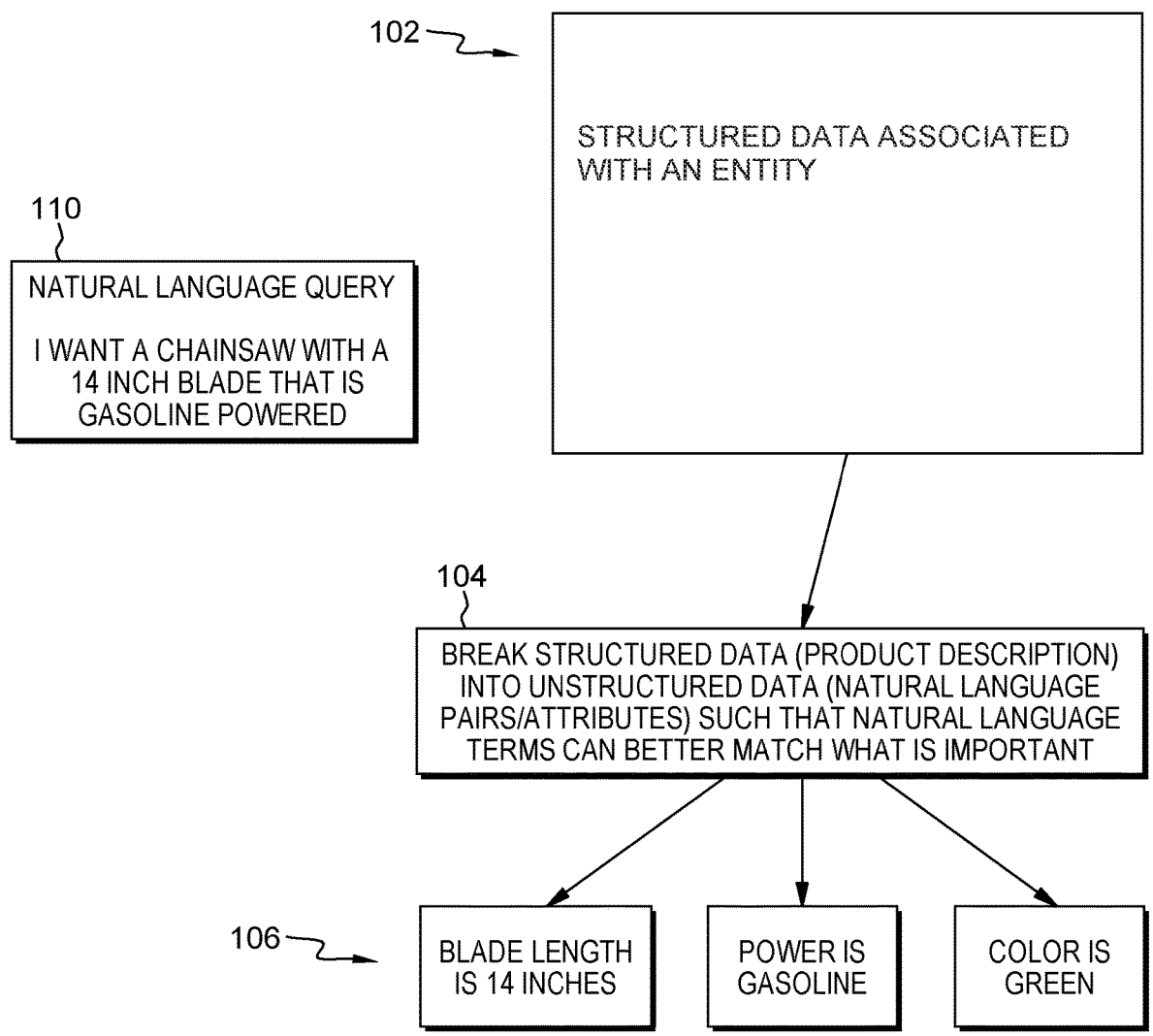
FIG. 1 generally illustrates breaking structure data into unstructured natural language texts in accordance with embodiments of the invention.

Most enterprise systems are a rich source of structured data. They can be converted to unstructured text data for enabling natural language search. With reference to FIG. 1, embodiments of the invention, generally, comprise examining 102 structured data associated with an entity in, for example, a data catalog, breaking 104 the structured data into multiple unstructured natural language pair attributes 106 such that natural language search terms 110 can better match the attributes associated with the entity, and returning a tailored search result based on the matching.

Figure 2:
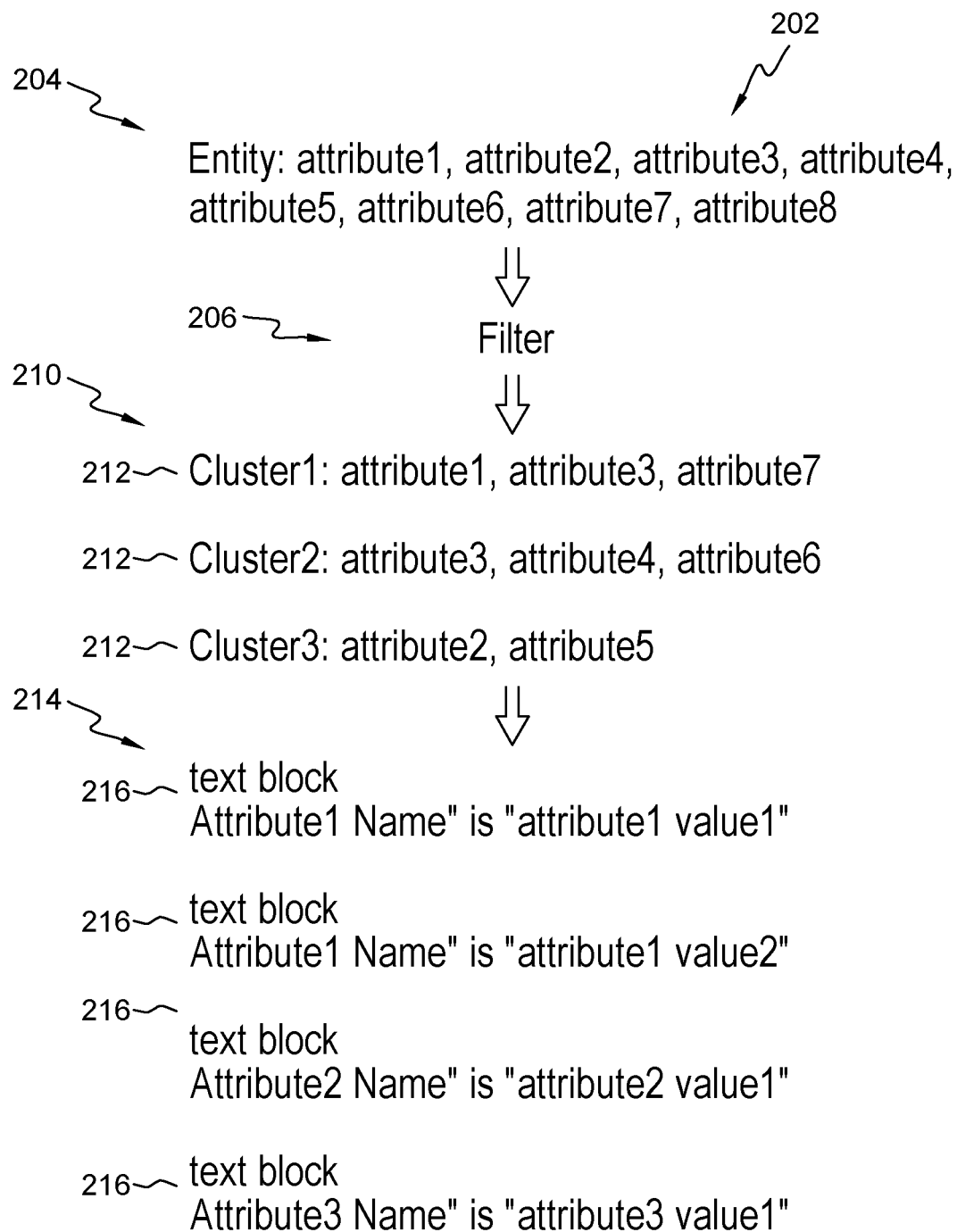
FIG. 2 shows in more detail a method of an embodiment of the invention for converting structured text into unstructured text.

FIG. 2 shows a list of attributes 202 associated with an entity 204. As discussed in more detail below, the attributes, in embodiments of the invention, may be filtered, at 206, to reduce the number of attributes that are further processed and searched. This reduces the time needed to generate the unstructured text and reduces the noise in the process.

Embodiments of the invention cluster attributes, at 210, based on semantic similarities to form clusters 212 of the attributes, and, at 214, create separate blocks 216 of text which can then be utilized for natural language search. As an example, the catalog of a home improvement retailer contains products with many attributes such as height, weight, volume, voltage, wattage, load size, wash cycles etc. Embodiments of the invention cluster attributes such as height, weight, volume and other similar attributes into a cluster representing dimensions. The attributes such as wattage, voltage, number of batteries and the like can be grouped into a cluster representing energy specifications and so on. Procedures for clustering attributes in this way are known, and any suitable procedure may be used to cluster the attributes.

Embodiments of the invention then create unstructured text blocks 216 for each cluster by creating texts, for example, in the format "Attribute Name" is "Attribute Value", for all instances where the attribute value is not null. For example: the pair color/red becomes "color is red". Each text block is deemed as an individual document in the corpus being searched. This approach creates documents with semantically related content with noise taken out of them. This, in turn, directly impacts the search relevancy in either making documents highly relevant or highly irrelevant.

If multiple values are available rather than a single name/value pair such as when it is a list of available options, the system, in embodiments of the invention, adds the values together, as, for example, "Attribute Name" is "First Value" AND "Second Value" AND . . . "N Value". Additional words such as "is available in," and "options include" could be used to point out that multiple values can be added. For instance, a "Color" "multiple value" data may be presented as: "Color is available in red, orange, green, and blue."

As mentioned above, the attributes may be filtered, based on specified criteria, to identify a smaller, filtered group of attributes associated with an entity. In embodiments of the invention, this filtering uses search facets, which are commonly used to narrow product searches.

Many retail websites have the notion of search facets which are used to narrow down possible search results to show more relevant product results. For example, on some websites, these facets can be seen on the left hand side of a search screen. Alternatively, often times breadcrumbs or a visual below the search bar shows attributes selected to filter results.

As an example, FIG. 3 shows facets listed during a search for power saws. As can be seen, the search facets include: Power Source, Power Tool Cord Style, Tool items Included, Brand, and Saw Blade Size. Color is not listed as an attribute, perhaps because people do not tend to narrow down a search for the saws by color. If a user clicks on one particular item, the user may be presented with a more detailed product and technical detail list, as shown in FIG. 4.

It would be possible to take all of the database structured values and convert them into natural language sentences to help with natural language search. A disadvantage of this approach is it causes noise. In the case of the attributes shown in FIG. 4, color would be converted to "The color is black." This can slow down the search if the corpus of information is too large or causes irrelevant products to be displayed depending on the search. As the number of available attributes for an item increases, this becomes a bigger problem. For example, if there are 500 attributes but only five are commonly used to filter in comparison to other products in the same general category, then only those five attributes would be needed to be added to the natural language entry.

Embodiments of the invention learn over time which facets are used the most for the parent category of products—it is possible, using known procedures, to track user behavior such as facets selected and deselected. For example, in an embodiment, the system might find out that people tend to narrow a search for power saws based on blade size, brand, power source, and cord type, and the system can be trained on the natural language expansion of those attributes from the structured database. For example, in an embodiment of the invention, the system might learn that the natural language expansion of the popular attributes is: "The blade size is six inches, the brand is X, the power source is electric, the cord type is cordless."

If over time, less people are using the facet for the cord type, the system might periodically update the corpus information, and therefore the new entry would become: "The blade size is six inches, the brand is X, the power source is electric."

Figure 5:
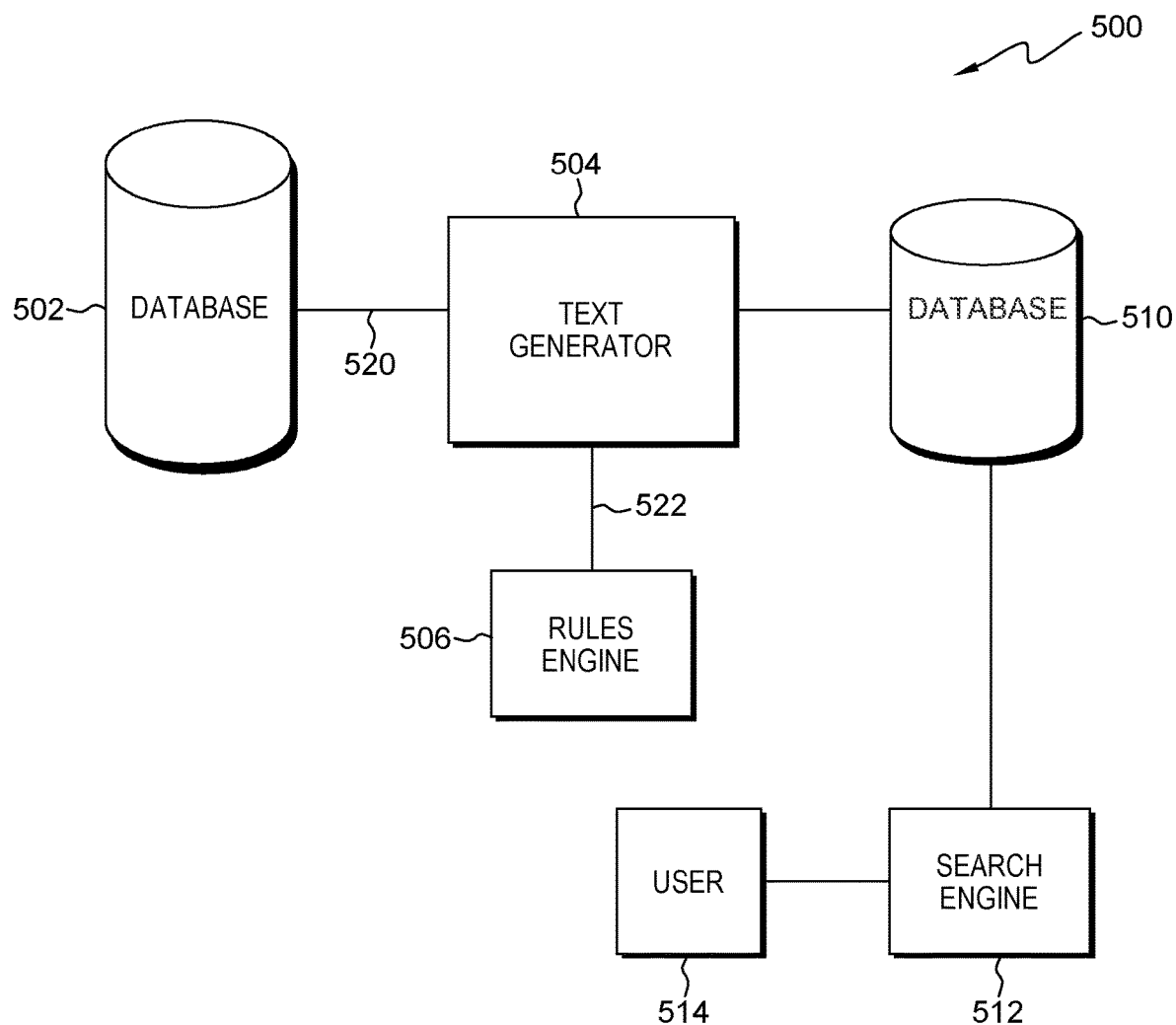
FIG. 5 shows a computer system, in accordance with an embodiment of the invention, for generating unstructured text from structured data.

FIG. 5 shows a system 300 in accordance with an embodiment of the invention. Generally, system 500 comprises a database 502 of structured data, text generator 504, rules engine 506, and a database 510 of unstructured text. FIG. 5 also shows a search engine 512 for searching the database 510 of unstructured text.

Database 502 comprises structured data and is functionally connected to text generator 504 via communications link 520. The text generator 504 is functionally connected to rules engine 306 via communications link 522, and the text generator is functionally connected to database 510 by communications link 524. The text generator 504 is provided for converting structured data in database 502 to unstructured text, and the rules engine 506 holds the rules for converting the structured data to the unstructured text. The text generator communicates with the rules engine in order to transform structured data in database 502 to unstructured text in accordance with the rules in the rules engine.

Communications links 520, 522 and 524 may be a hardwired bus, a wireless link, or any other type of communications link, including optical links, software function calls, and the like, known to those skilled in the art. Also, as will be understood by those of ordinary skill in the art, databases 502 and 510, text generator 504 and rules engine 506 may be implemented as combinations of hardware and software.

System 500 is used to generate a text collection 526 from the structured data in database 502 in accordance with embodiments of the invention, and in particular, the text generator converts data in database 502 to unstructured text in accordance with the rules in rules engine 506. The system 500 may be used in an off-line manner when generating the text collection. The generated text is stored in database 510.

Once generated and stored in database 510, the text in the database 510 may be searched in a conventional manner through an on-line search engine 512 using natural language. A user 530 may input a search query to the search engine using natural language; and the search engine conducts a search in response to the query, formulates a set of search results and transmits those results to the user.

Figure 6:
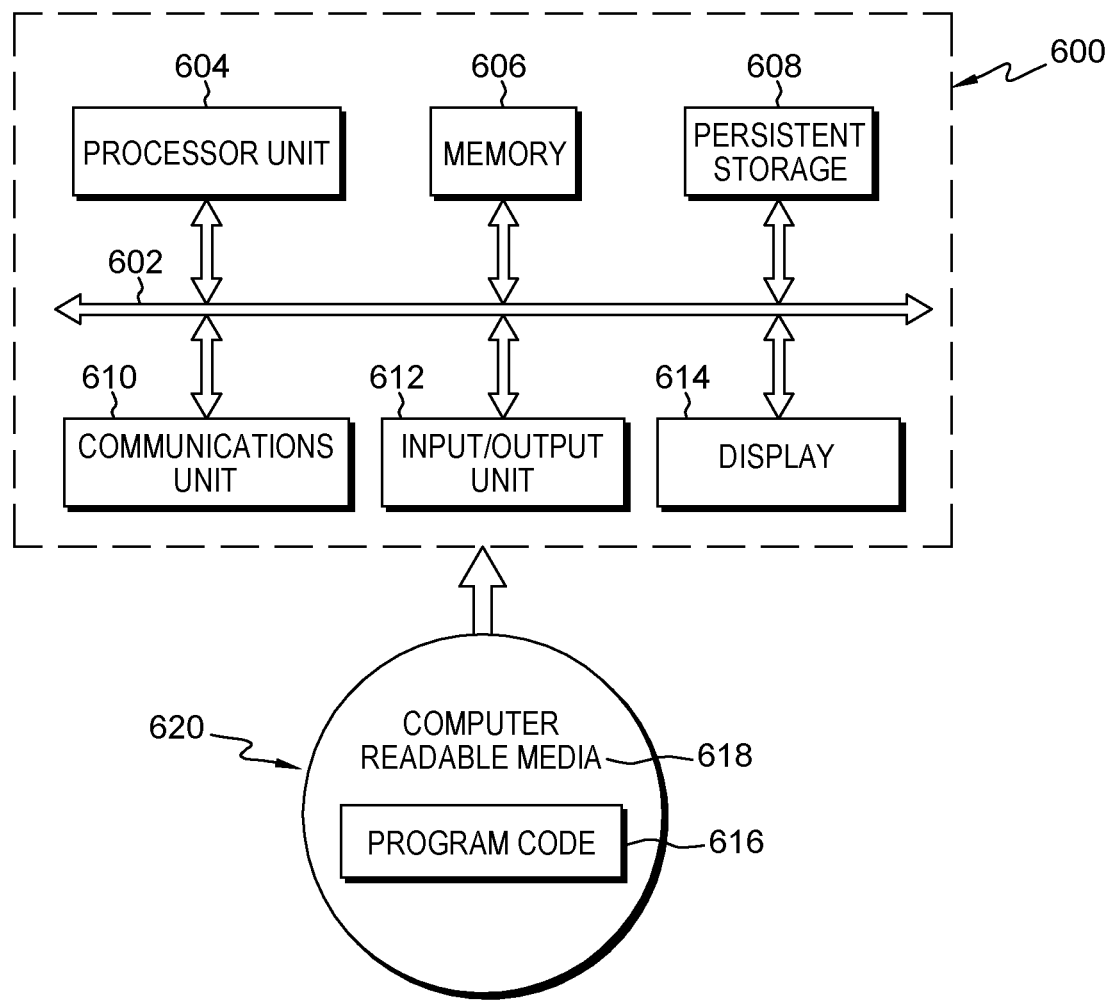
FIG. 6 depicts a processing system that may be used in the computer system of FIG. 5.

With reference now to FIG. 6, a block diagram of a data processing system 600 is shown. Data processing system 600 is an example of a computer that may be used in the present invention or to implement aspects of the invention, and for example, processing system 600 may be used to implement text generator 502 of FIG. 5. In this illustrative example, data processing system 600 includes communications fabric 602, which provided communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Memory 606 and persistent storage 608 are examples of storage devices. Memory 406, in these examples, may be a random access memory or any other suitable volatile or non-volatile storage device. Persistent storage 608 may take various forms depending on the particular implementation. For example, persistent storage 608 may be a hard drive, a flash memory, a rewritable optical disk, a rewritable magnetic tape, or some combination of the above.

Communications unit 610, in these examples, provides for communications with other data processing systems or devices. In these examples, communications unit 610 is a network interface card. Communications unit 610 may provide communications through the use of either or both physical and wireless communications links. Input/output unit 612 allows for input and output of data with other devices that may be connected to data processing system 600. For example, input/output unit 612 may provide a connection for user input through a keyboard and mouse. Further, input/output unit 612 may send output to a printer. Display 614 provides a mechanism to display information to a user.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

What is claimed is:

1. A method of generating text for a search corpus, comprising:
   analyzing structured data associated with an entity;
   breaking the structured data into multiple unstructured natural language pair attributes such that natural language search terms have an increased level of matching with attributes associated with the entity, including
   filtering the structured data, based on predetermined criteria, to identify a filtered group of attributes associated with the entity, wherein identifying the filtered group of attributes comprises analyzing attributes representing dimensions and energy specifications of an apparatus, and
   using the filtered group of attributes to form the natural language pair attributes; and saving the formed natural language pairs in a search corpus;
   generating a cluster of the attributes from the filtered group of attributes based on semantic similarities; and
   removing noise from semantically related content associated with the semantic similarities.

2. The method according to claim 1, wherein the using the filtered group of attributes to form the natural language pair attributes includes:
   creating blocks of text that respectively describe the attributes included in the cluster of the attributes.

3. The method according to claim 2, further comprising:
   processing one or more natural language searches based, at least in part, on the cluster of the attributes.

4. The method according to claim 2, wherein each of said blocks of text includes a name for one of the attributes in the cluster of the attributes, and an associated value for the one of the attributes.

5. The method according to claim 1, wherein the filtering the structured data includes:
   selecting one or more defined facets of the entity; and
   using the selected facets to filter the structured data.

6. The method according to claim 5, wherein the selecting one or more defined facets includes:
   identifying a group of defined facets;
   tracking specified uses of the group of defined facets over a period of time; and
   selecting the one or more defined facets, from said group of defined facets, based on the tracked specified uses of the group of defined facets over the period of time.

7. The method according to claim 6, wherein:
   the tracking specified uses of the group of defined facets over a period of time comprises tracking uses of the group of defined facets over the period of time during computer searches for the entity over the period of time; and
   the method further comprises removing one or more of the natural language pair attributes from the search corpus when a defined popularity of a specified one of the facets falls below a given value.

8. The method according to claim 1, wherein:
   the using the filtered group of attributes to form the natural language pair attributes includes forming a natural language block of text including all the attributes associated with the entity and having a defined popularity.

9. The method according to claim 1, further comprising:
   clustering the attributes of the filtered set of attributes into a plurality of clusters of the attributes based on semantic similarities; and
   wherein the using the filtered group of attributes to form the natural language pair attributes includes:
   forming one or more unstructured, natural language blocks of text from each of the clusters; and
   storing each of the blocks of text as a document in the search corpus to create documents with the semantically related content.

10. A computer system for generating text for a search corpus, comprising:
    a memory for storing data:
    one or more processor units operatively connected to the memory for transmitting data to and receiving data from the memory, the one or more processing units being configured for:
    analyzing structured data associated with an entity;
    breaking the structured data into multiple unstructured natural language pair attributes such that natural language search terms have an increased level of matching with attributes associated with the entity, including
    filtering the structured data, based on predetermined criteria, to identify a filtered group of attributes associated with the entity, wherein identifying the filtered group of attributes comprises analyzing attributes representing dimensions and energy specifications of an apparatus, and using the filtered group of attributes to form the natural language pair attributes; and saving the formed natural language pairs in a search corpus;

generating a cluster of the attributes from the filtered group of attributes based on semantic similarities; and removing noise from semantically related content associated with the semantic similarities.

11. The computer system according to claim 10, wherein:
the one or more processor units are further configured for using the filtered set of attributes to form the natural language pair attributes includes creating blocks of text that respectively describe the attributes included in the cluster of the attributes.

12. The computer system according to claim 10, wherein the filtering the structured data includes:
selecting one or more defined facets of the entity, including
identifying a group of defined facets,
tracking specified uses of the group of defined facets over a period of time, and
selecting the one or more defined facets, from said group of defined facets, based on the tracked specified uses of the group of defined facets over the period of time; and
using the selected facets to filter the structured data.

13. The computer system according to claim 12, wherein the tracking specified uses of the group of defined facets over a period of time comprises tracking uses of the group of defined facets over the period of time during computer searches for the entity over the period of time.

14. The computer system according to claim 10, wherein:
the using the filtered group of attributes to form the natural language pair attributes includes forming a natural language block of text including all the attributes associated with the entity and having a defined popularity.

15. A computer readable program product for generating text for a search corpus, the computer readable program product comprising:
a computer readable storage medium having program instructions embodied therein, the program instructions executable by a specified computer to cause the specified computer to perform the method of:
analyzing structured data associated with an entity;
breaking the structured data into multiple unstructured natural language pair attributes such that natural language search terms have an increased level of matching with attributes associated with the entity, including
filtering the structured data, based on predetermined criteria, to identify a filtered group of attributes associated with the entity, wherein identifying the filtered group of attributes comprises analyzing attributes representing dimensions and energy specifications of an apparatus, and
using the filtered group of attributes to form the natural language pair attributes; and
saving the formed natural language pairs in a search corpus;
generating a cluster of the attributes from the filtered group of attributes based on semantic similarities; and
removing noise from semantically related content associated with the semantic similarities.

16. The computer readable program product according to claim 15, wherein:
the method further comprises
using the filtered set of attributes to form the natural language pair attributes includes creating blocks of text that respectively describe the attributes included in the cluster of the attributes.

17. The computer readable program product according to claim 15, wherein the filtering the structured data includes:
selecting one or more defined facets of the entity, including
identifying a group of defined facets,
tracking specified uses of the group of defined facets over a period of time, and
selecting the one or more defined facets, from said group of defined facets, based on the tracked specified uses of the group of defined facets over the period of time; and
using the selected facets to filter the structured data.

18. The computer readable program product according to claim 17, wherein the tracking specified uses of the group of defined facets over a period of time comprises tracking uses of the group of defined facets over the period of time during computer searches for the entity over the period of time.

19. The computer readable program product according to claim 15, wherein:
the using the filtered group of attributes to form the natural language pair attributes includes forming a natural language block of text including all the attributes associated with the entity and having a defined popularity.

* * * * *